United States Patent
Lee et al.

(10) Patent No.: US 7,351,454 B2
(45) Date of Patent: Apr. 1, 2008

(54) COMPOSITION FOR FORMING LIQUID CRYSTAL ALIGNMENT LAYER OF LIQUID CRYSTAL DISPLAY

(75) Inventors: Jun-Woo Lee, Anyang-si (KR); Jong-Ho Son, Seoul (KR)

(73) Assignee: Samsung Electronics Co., Ltd. (KR)

( * ) Notice: Subject to any disclaimer, the term of this patent is extended or adjusted under 35 U.S.C. 154(b) by 212 days.

(21) Appl. No.: 11/201,122

(22) Filed: Aug. 11, 2005

(65) Prior Publication Data

US 2006/0035038 A1 Feb. 16, 2006

(30) Foreign Application Priority Data

Aug. 12, 2004 (KR) ...................... 10-2004-0063539

(51) Int. Cl.
*C09K 19/56* (2006.01)
(52) U.S. Cl. ..................... 428/1.2; 428/1.26; 252/299.4
(58) Field of Classification Search ............... 428/1.25, 428/1.26, 1.2; 528/301; 252/299.4
See application file for complete search history.

(56) References Cited

U.S. PATENT DOCUMENTS

| 5,571,579 A | * | 11/1996 | Kato et al. | .................. 428/1.25 |
| 5,674,575 A | * | 10/1997 | Abe et al. | ................... 428/1.27 |
| 6,046,303 A | * | 4/2000 | Choi et al. | ................... 528/353 |
| 6,797,344 B2 | * | 9/2004 | Chu et al. | ................... 428/1.26 |
| 2004/0102603 A1 | * | 5/2004 | Chu et al. | ................... 528/353 |

* cited by examiner

*Primary Examiner*—Shean C Wu
(74) *Attorney, Agent, or Firm*—Cantor Colburn LLP

(57) ABSTRACT

The present invention relates to a liquid crystal alignment layer of a liquid crystal display that can minimize drop blemishes of liquid crystal in the ODF process. The present invention provides a composition of a liquid crystal alignment layer comprising a diamine compound represented by Formula 1 below, an acid anhydride, and a solvent, in which the diamine compound represented by Formula 1 has a concentration of 15-40 mol %:

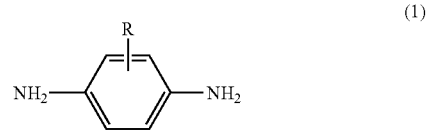

(1)

where R is a $C_{10}$-$C_{30}$ saturated or unsaturated alkyl, allyl, or aromatic hydrocarbon that is substituted by a heteroatom or is unsubstituted.

The invention also provides a liquid crystal alignment layer and a liquid crystal display that comprises the liquid crystal alignment layer.

9 Claims, 2 Drawing Sheets

COMPOSITION FOR FORMING LIQUID CRYSTAL ALIGNMENT LAYER OF LIQUID CRYSTAL DISPLAY

CROSS REFERENCE TO RELATED APPLICATION

This application claims priority to and the benefit of Korean Patent Application No. 10-2004-0063539 filed on Aug. 12, 2004, which is hereby incorporated by reference for all purposes as if fully set forth herein.

BACKGROUND OF THE INVENTION (a) Field of the Invention

The present invention relates to vertically aligned (VA) liquid crystal alignment layer of a liquid crystal display. In particular, the present invention relates to the composition of a liquid crystal alignment layer of a liquid crystal display that is capable of improving the ODF (one drop filling) blemish defect of a liquid crystal display, by reducing drop blemishes and improving the dropping process margin.

(b) Description of the Background

As fifth and seventh generation LCDs emerge, liquid crystal displays (LCD) are becoming larger in size, for example, 1870×2200 mm). The ODF process is an essential liquid crystal dropping process, in terms of processing time and line capability in manufacturing such large LCDs.

In the liquid crystal dropping process, a liquid crystal dispenser or a stage is moved while dotting a specific amount of liquid crystal onto a substrate in a specific pattern as shown in FIG. 3. The cell gap of the liquid crystal is determined by the column spacer and its accuracy is affected by the amount of the liquid crystal that is being deposited.

Although the ODF process has many advantages over the conventional vacuum filling process in which liquid crystal material is injected between two substrates, new types of defects emerge from the ODF process. A typical example of such defects is the drop blemish.

A drop blemish results from the difference in retardation at the area where the liquid crystal has been dropped during the ODF process and the area where the liquid crystal has not been dropped. While this difference has not been fully understood, one plausible theory that is supported by experimentation argues that when two substrates are adjoined, the liquid crystal dropped on the alignment layer exerts flow (shear) force to the alignment layer and damages it. As a result, the pretilt angle of the alignment layer, etc. are changed and a blemish is formed.

A change in the pretilt angle of the alignment layer may disappear during heat treatment after the ODF process. However, if the deformation is severe, the change in pretilt angle may persist and form a drop blemish.

Conventional alignment layers have been developed with regard to the voltage holding ratio (VHR) and the residual DC (RDC), without an external force being applied, without considering drop blemishes. The surface energy of the alignment layer is set lower than the modal alignment layer of the display, and thus the liquid crystal becomes less spreadable.

SUMMARY OF THE INVENTION

The present invention provides a composition for a liquid crystal alignment layer that leaves no drop blemishes after the ODF process. It achieves this by adjusting the vertical alignment component of a liquid crystal alignment layer by controlling the concentration of a composition that forms the liquid crystal alignment layer. If the tendency of vertical alignment of an alignment layer is sufficiently stronger than the shear force of liquid crystal, there will be little or no change in pretilt angle during the ODF process and thus no blemish will be formed. This invention optimizes solubility, printing characteristics, and surface tension of the alignment layer to improve spreadability of the liquid crystal material. This allows the liquid crystal alignment layer to maintain a large pretilt angle and reduce drop blemishes.

The present invention also provides a vertically aligned (VA) alignment layer.

Additional features of the invention will be set forth in the description which follows, and in part will be apparent from the description, or may be learned by practice of the invention.

The present invention discloses composition for a liquid crystal alignment layer that comprises a diamine compound represented by Formula 1 below, an acid anhydride, and a solvent. The diamine compound represented by Formula 1 has a concentration of 15-40 mol %.

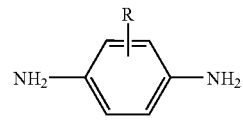

(1)

In Formula 1, R is a $C_{10}$-$C_{30}$ saturated or unsaturated alkyl, allyl, or aromatic hydrocarbon that is substituted by a heteroatom or is unsubstituted.

The present invention also discloses a liquid crystal alignment layer that is formed by coating the composition on a substrate on which a transparent electrode has been formed, and curing it.

The present invention also discloses a liquid crystal display comprising the liquid crystal alignment layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Figure 1A:
FIG. 1a and FIG. 1b are electron micrographs that show drop blemishes of the alignment layers of Comparative Example 2 and Example 1, respectively.

The vertically aligned (VA) liquid crystal alignment layer of the present invention comprises a polyimide-based polymer, which can be obtained from the reaction of a diamine compound and an acid anhydride in a solvent, for example.

The alignment layer is preferably a 1:1 copolymer of an acid anhydride and a diamine. The alignment layer may be classified into the poly(amic acid) type and the polyimide type depending on the main chain structure of the polymer. Monomers used in the polymerization may include at least two or three kinds of diamines and acid dianhydrides.

Preferably, the vertical alignment component used as a liquid crystal alignment agent in the present invention maintains the vertical alignment force. For example, a compound that has a side pendant group substituted by an R group between two diamine groups, as represented by Formula 1 below may be used as the diamine compound:

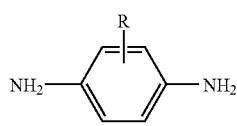

(1)

where R is a $C_{10}$-$C_{30}$ saturated or unsaturated alkyl, allyl, or is an aromatic hydrocarbon that is substituted by a heteroatom or is unsubstituted.

Thus, the liquid crystal alignment agent of the present invention contains the structure represented by Formula 2 below:

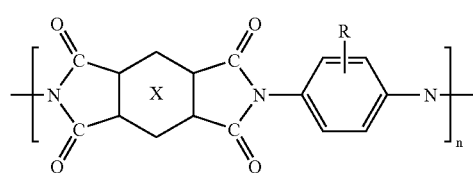

(2)

where R is a $C_{10}$-$C_{30}$ a saturated or unsaturated alkyl, allyl, or is an aromatic hydrocarbon that is substituted by a heteroatom or is unsubstituted, X is benzene or an aliphatic ring, and n is the degree of polymerization.

As the concentration of the compound represented by Formula 1 increases, the vertical alignment force also increases. The maximum theoretical concentration of the compound represented by Formula 1 is 50 mol %. However, the optimal concentration of the diamine of Formula 1 is also limited by the solubility, printing characteristics, surface tension, and other properties of the liquid crystal alignment layer.

For example, if the concentration of the compound represented by Formula 1 increases, the surface tension of the alignment layer drops, making the liquid crystal becomes less spreadable (currently, typical VA alignment layers have a surface tension of about 35-36 dyne/cm$^2$). In addition, while it is difficult to directly link the shear force of the liquid crystal to the rubbing force, it is preferable to increase the concentration of the compound represented by Formula 1 to prevent drop blemishes by reducing the pretilt angle during the ODF process.

When the alignment layer is not rubbed, a vertical alignment can be achieved with a small concentration of the compound represented by Formula 1. However, if the alignment layer is rubbed, the applied external force requires the concentration of the compound represented by Formula 1 to be high enough to attain a vertical alignment.

Accordingly, the concentration of the compound represented by Formula 1 must be optimized by taking into account the relationship of the vertical alignment force and the surface tension of the alignment layer, the degree of drop blemish formation in the current ODF process, and the stability of pretilt angle affected by rubbing of the alignment layer. Accounting for the various parameters, the concentration of the compound represented by Formula 1 is controlled at 15-40 mol %, and preferably at 20-35 mol %, to minimize drop blemishes by the liquid crystal after the ODF process. This concentration of the compound represented by Formula 1 minimizes the pretilt angle due to external force (shear force of the liquid crystal) and increases the surface tension of the alignment layer to higher than that of the currently available vertically aligned (VA) alignment layer to improve spreadability of the liquid crystal.

If the content of the compound represented by Formula 1 falls below 15 mol %, the vertical alignment force may be insufficient when the alignment layer is rubbed, thereby causing excessive drop blemish formation during the dropping process. Otherwise, if the concentration exceeds 40 mol %, the surface tension becomes low, so that the liquid crystal becomes less spreadable, although the alignment stability may be attained.

The acid anhydride used to prepare the VA alignment layer may be any compound that is used in preparing a polyimide based alignment layer, such as a carboxylic acid dianhydride, for example. Preferably, at least one compound including, but not limited to, an aromatic, aliphatic, or alicyclic tetracarboxylic acid dianhydride may be used. Examples of the tetracarboxylic acid dianhydride are 2,2-bis(3,4-dicarboxyphenyl)hexafluoropropane dianhydride, 4,4-bis(3,4-dicarboxytrifluorophenoxy)tetrafluorobenzene dianhydride, 1,4-bis(3,4-dicarboxytrifluorophenox dianhydride, (trifluoromethyl)pyromellitic acid dianhydride, di(trifluoromethyl)pyromellitic acid dianhydride, di(heptafluoropropyl)pyromellitic acid dianhydride, etc.

To produce the liquid crystal alignment agent of Formula 2, a solvent that uniformly mixes the compound represented by Formula 1 and the acid anhydride and enables polymerization may be required. The solvent may be any compound that can dissolve polyimide. Even if unable to dissolve a polyimide precursor, a solvent that does not significantly affect the solubility may be used. That is, at least one solvent such as a common polar solvent or a nonpolar solvent may be used.

To be specific, the solvent is preferably at least one compound including, but not limited to, γ-butyrolactone, N-methylpyrrolidone (NMP), N-ethylpyrrolidone, N-vinylpyrrolidone, N,N-dimethylacetamide, N,N-dimethylformamide, ethylcellosolve, butylcellosolve, ethylcarbitol, butylcarbitol (BC), ethylcarbitol acetate, ethylene glycol, propylene glycol monoacetate, propylene glycol diacetate, dipropylene glycol, and dipropylene glycol monomethyl ether.

The following is a description of a preferred embodiment of the present invention with reference to the attached drawings.

Figure 2:
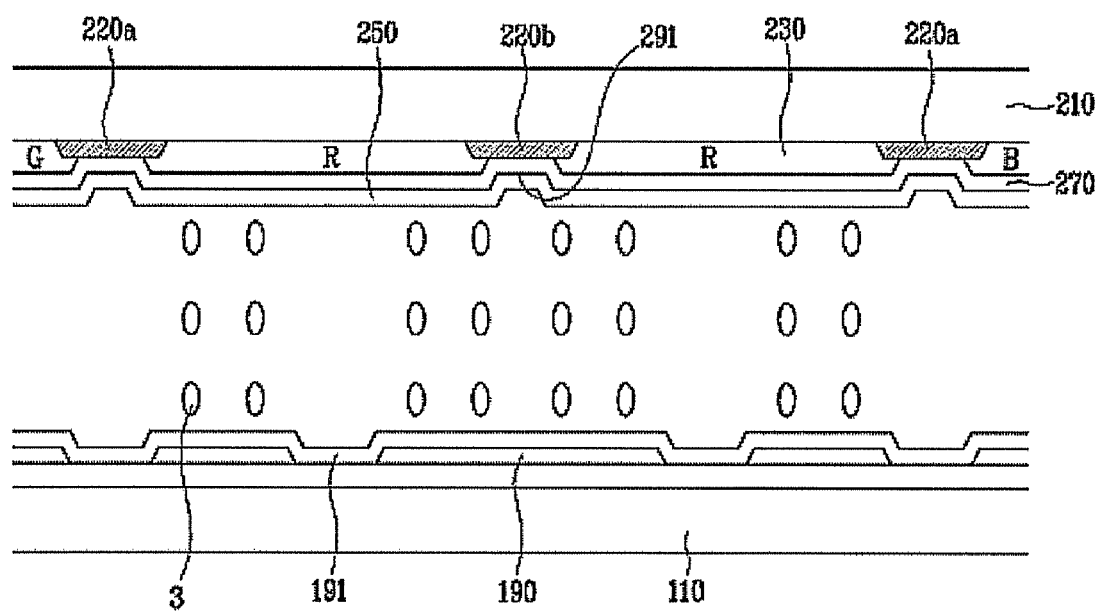
FIG. 2 is a cross-sectional view of the liquid crystal display according to an exemplary embodiment of the present invention.

FIG. 2 is a cross-sectional view of the liquid crystal display according to the present invention. As seen in FIG. 2, a transparent pixel electrode 190 is formed on a second substrate 110. The pixel electrode 190 is a transparent conducting film of ITO, IZO, etc. A pixel-cut pattern 191 is formed on the pixel electrode 190. A first substrate 210 opposes the second substrate 110 with a space therebetween.

An outer black matrix 220a and an inner black matrix 220b are positioned on the bottom of the substrate 210. The outer black matrix 220a defines a pixel area (A) and the inner black matrix 220b is patterned in the pixel area (A).

An RGB color filter 230 is positioned on the outer and inner black matrices 220a and 220b. The color filter 230 exposes the inner black matrix 220b since the part of it that contacts the inner black matrix 220b has been removed. The outer black matrix 220b may also be exposed at the interface of each color, without being covered by the color filter 230. Part of the color filter 230 overlaps and contacts the outer and inner black matrices 220a, 220b and most of the other part of the color filter 230 directly contacts the first substrate 210.

A transparent reference electrode 270 is positioned beneath the outer and inner black matrices 220a, 220b and the color filter 230. Although it is not illustrated in the figure, an overcoat layer is formed between the bottom of the color filter and the reference electrode. The reference electrode is formed as a groove 291 beneath the inner black matrix 220b. The alignment layer 250 of the present invention is formed on one side of the reference electrode 270.

Liquid crystal molecules 3 with a negative dielectric anisotropy are injected between the first substrate 210 and the second substrate 110. That is, the liquid crystal molecules 3 are aligned vertically with respect to the two substrates 110, 210 unless a voltage is applied between the pixel electrode 190 and the reference electrode 270.

When a voltage is applied between the pixel electrode 190 and the reference electrode 270, an electric field (E) is formed between the first and second substrates 110, 210. Because of the groove 291 of the reference electrode 270 that is formed at the position where the pixel-cut pattern 191 of the pixel electrode 190 and the inner black matrix 220b overlap, the electric field is not vertical to the two substrates 110, 210 but is inclined with a slope causing a fringe field. Because the liquid crystal molecules 3 having a negative dielectric anisotropy tend to align vertical to the electric field, they are aligned so that the major axes of the liquid crystal molecules 3 are inclined against the surface of the substrates 110, 210. As a result, a region appears where the liquid crystal molecules 3 are inclined along opposite directions centered on the pixel-cut pattern 191 and the groove 291 of the reference electrode. In this region, the optical characteristics are offset, and thus a wider view angle is obtained.

The liquid crystal alignment layer is formed by first mixing a diamine, an acid dianhydride, and a solvent to prepare a polyimide precursor solution. This solution is then passed through a microporous filtration membrane to remove undissolved impurities. Then, the solution is coated onto a substrate on which a transparent electrode has been formed. The substrate is cured and the solvent is removed.

Next, the alignment layer is formed by imidization. The coating of the alignment agent and the curing may be performed under an inert gas atmosphere of nitrogen, helium, argon, etc., or if required, under a reduction gas atmosphere such as hydrogen, etc. The coating of the alignment agent on the substrate may be performed by roll coating, spraying, spin coating, printing, ink jetting, etc. The coating thickness is preferably 700-1,200 Å. The coated substrate is then cured by imidization by drying it at 200-230° C. for ten minutes to an hour.

The substrate may be, but is not limited to a silicon wafer, glass, plastic, etc. The transparent electrode formed on the substrate may be a metal oxide containing tin, indium, zinc, etc., such as, ITO, IZO, indium oxide-tin oxide ($In_2O_3$—$SnO_2$). The transparent electrode may be patterned by photoetching, masking, etc.

The alignment layer may be surface-treated by irradiation of an ion beam, molecular beam, atomic beam, etc., or by rubbing to improve alignment of liquid crystal.

The present invention also provides a liquid crystal display prepared using the alignment layer by the conventional method. For example, a first substrate and a second substrate upon which an alignment layer has been formed are prepared. Then, a UV-thermosetting sealant is coated on the first substrate. The first substrate and the second substrate are adjoined inside a VAS (vacuum alignment system) and WV is irradiated to cure the sealant. The UV irradiation may be performed by full exposure, mask exposure, or scanning exposure, etc.

Then, liquid crystal is injected into the cell gap formed by the substrates and the sealant. Finally, the inlet is sealed to form a liquid crystal display. A polarizing plate may be positioned on the other side of the substrate that forms the liquid crystal cell. The polarizing plate may be aligned parallel with or perpendicular to the alignment direction of the liquid crystal alignment layer.

The liquid crystal alignment layer of the present invention can be applied to an active matrix thin-film transistor (TFT) liquid crystal display, an active matrix Metal-Insulator-Metal (MIM) liquid crystal display, an active matrix IPS (in-plane switching) liquid crystal display, a simple matrix twisted nematic liquid crystal display, a simple matrix super twisted nematic liquid crystal display, a thin-film transistor-twisted nematic (TFT-TN) liquid crystal display, an array on color filter (AOC) or color filter on array (COA) liquid crystal display, an optically compensated bend mode liquid crystal display, etc.

Hereinafter, the present invention is described in more detail through examples. However, the following examples are only for the understanding of the present invention and the present invention is not limited by them.

EXAMPLES 1-2 AND COMPARATIVE EXAMPLES 1-2

The compound represented by Formula 1 was dissolved in a 1:1 mixture solvent of N-methylpyrrolidone (NMP) and butylcellosolve to a concentration given in Table 1 below. The solution was passed through a microporous filtration membrane to remove impurities. Then, the solution was coated on a glass substrate onto which an ITO electrode had been formed to a thickness of 1,000 Å.

Figure 1B:
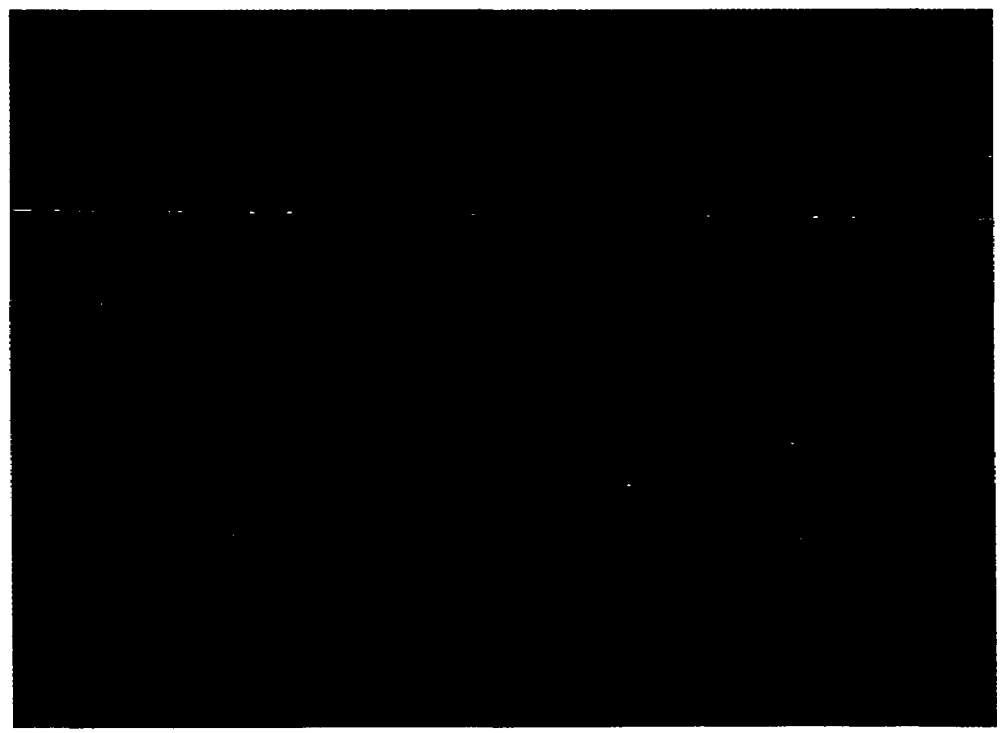
Figure 3:
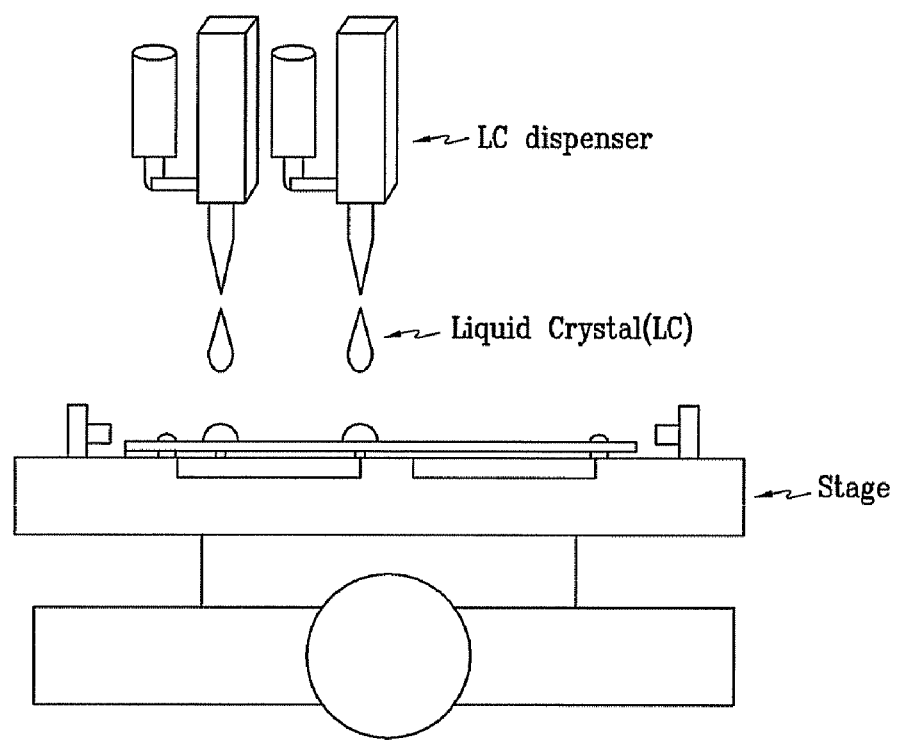
FIG. 3 is a schematic view of the liquid crystal dropping apparatus for dropping liquid crystal.

Imidization was performed by drying the substrate at 200° C. for about 30 minutes to obtain each alignment layer of Comparative Examples 1-2 and Examples 1-2. Each alignment layer was rubbed and the ODF process was performed by the conventional method using the apparatus shown in FIG. 3. Pretilt angle was measured and a drop test was performed. The results are presented in Table 1 below. The degree of drop blemish for Comparative Example 2 and Example 1 is shown in FIG. 1a and FIG. 1b, respectively.

TABLE 1

| Alignment layer | Compound represented by Formula 1 (mol %) | Pretilt angle | | Drop blemish |
|---|---|---|---|---|
| | | Non-rubbing | Rubbing | |
| Comparative Example 1 | 13 | 90.0 | 88.1 | Moderate |
| Comparative Example 2 | 5 | 90.0 | 85.5 | Severe |

TABLE 1-continued

| Alignment layer | Compound represented by Formula 1 (mol %) | Pretilt angle | | Drop blemish |
|---|---|---|---|---|
| | | Non-rubbing | Rubbing | |
| Example 1 | 40 | 90.0 | 90.0 | — |
| Example 2 | 20 | 90.0 | 89.6 | — |

As seen in Table 1, FIG. 1a, and FIG. 1b, there were no drop blemishes after the ODF process in Examples 1-2 (see FIG. 1b for Example 1) since the drop margin was improved by optimizing the content of the alignment component comprising the alignment layer. On the contrary, there were significant drop blemishes in Comparative Example 2 (see FIG. 1a).

While the present invention has been described in detail with reference to the preferred embodiments and example, those skilled in the art will appreciate that various modifications and substitutions can be made thereto without departing from the spirit and scope of the present invention as set forth in the appended claims. Thus, it is intended that the present invention cover the modifications and variations of this invention provided they come within the scope of the appended claims and their equivalents.

What is claimed is:

1. A composition of a liquid crystal alignment layer, comprising:
   a diamine compound represented by Formula 1 below;
   an acid anhydride; and
   a solvent:

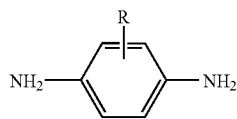

(1)

wherein R is a $C_{10}$-$C_{30}$ saturated or unsaturated alkyl, allyl, or aromatic hydrocarbon that is substituted by a heteroatom or is unsubstituted, and
   wherein the diamine compound represented by Formula 1 has a concentration of 15-40 mol %.

2. The composition of claim 1, wherein the compound represented by Formula 1 has a concentration of 20-35 mol %.

3. The composition of claim 1, wherein the solvent is at least one selected from the group consisting of a polar solvent and a nonpolar solvent.

4. The composition of claim 1, wherein the solvent is at least one selected from the group consisting of γ-butyrolactone, N-methylpyrrolidone (NMP), N-ethylpyrrolidone, N-vinylpyrrolidone, N,N-dimethylacetamide, N,N-dimethylformamide, ethylcellosolve, butylcellosolve, ethylcarbitol, butylcarbitol (BC), ethylcarbitol acetate, ethylene glycol, propylene glycol monoacetate, propylene glycol diacetate, dipropylene glycol, and dipropylene glycol monomethyl ether.

5. A liquid crystal alignment layer formed by coating the following composition on a substrate on which a transparent electrode has been formed, and curing the same,
   wherein the composition comprises:
   a diamine compound represented by Formula 1 below;
   an acid anhydride; and
   a solvent:

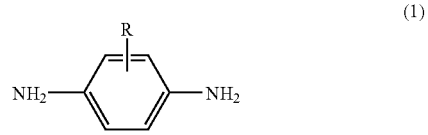

(1)

wherein R is a $C_{10}$-$C_{30}$ saturated or unsaturated alkyl, allyl, or aromatic hydrocarbon that is substituted by a heteroatom or is unsubstituted, and
   wherein the diamine compound represented by Formula 1 has a concentration of 15-40 mol %.

6. The liquid crystal alignment layer of claim 5, wherein the compound represented by Formula 1 has a concentration of 20-35 mol %.

7. The liquid crystal alignment layer of claim 5, wherein the solvent is at least one selected from the group consisting of a polar solvent and a nonpolar solvent.

8. The composition of claim 5, wherein the solvent is at least one selected from the group consisting of γ-butyrolactone, N-methylpyrrolidone (NMP), N-ethylpyrrolidone, N-vinylpyrrolidone, N,N-dimethylacetamide, N,N-dimethylformamide, ethylcellosolve, butylcellosolve, ethylcarbitol, butylcarbitol (BC), ethylcarbitol acetate, ethylene glycol, propylene glycol monoacetate, propylene glycol diacetate, dipropylene glycol, and dipropylene glycol monomethyl ether.

9. A liquid crystal display comprising the liquid crystal alignment layer of claim 5.

* * * * *